Sept. 20, 1960 W. BAER 2,953,113
STRUCTURE FOR PROTECTING THE PROPELLING
MEANS OF SHIPS AGAINST FLOATING BODIES
Filed May 27, 1954
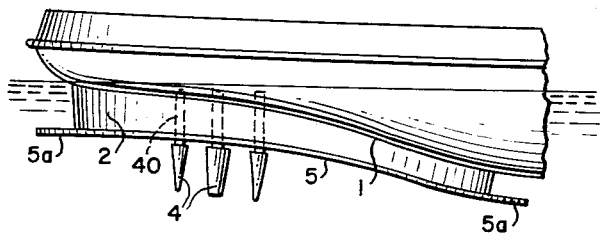
FIG.1
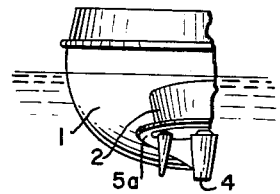
FIG.2
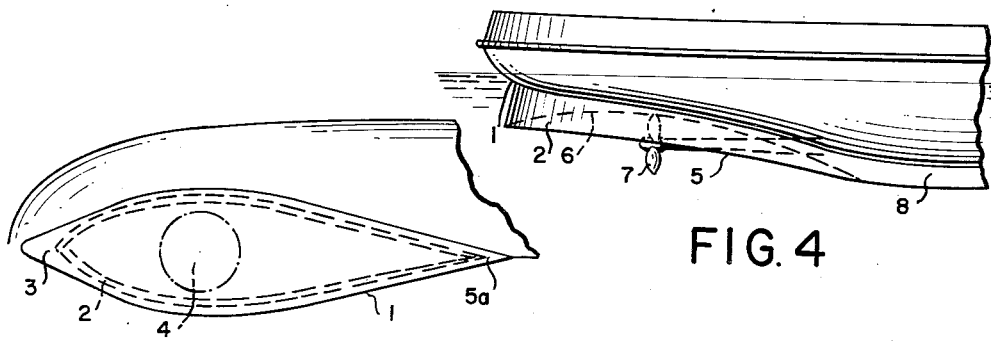
FIG.4
FIG.3
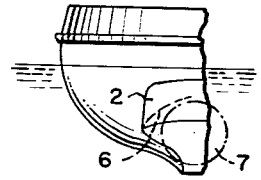
FIG.5
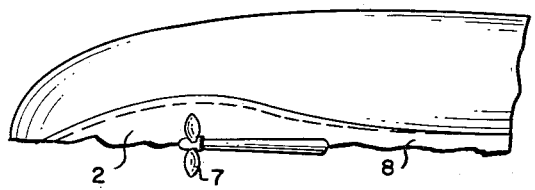
FIG.6
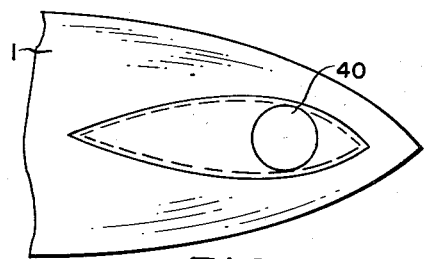
FIG.8
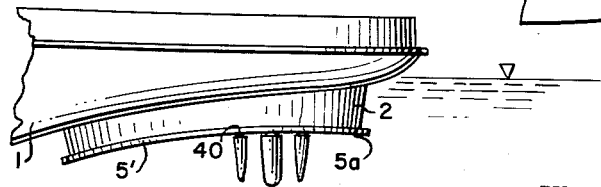
FIG.7
INVENTOR
WOLFGANG BAER
BY
Patent Agent United States Patent Office 2,953,113
Patented Sept. 20, 1960

2,953,113

STRUCTURE FOR PROTECTING THE PROPELLING MEANS OF SHIPS AGAINST FLOATING BODIES

Wolfgang Baer, Heidenheim-Mergelstetten, Germany, assignor to J. M. Voith G.m.b.H. Maschinenfabrik, Heidenheim (Brenz), Germany Filed May 27, 1954, Ser. No. 432,821

12 Claims. (Cl. 115—42)

In order to protect the driving means of ships such as the ship propeller, vane wheel propeller, or the like from contact with floating bodies, especially floating ice, it is known to provide the bottom of the ship within the range of the propeller afflux and efflux with a protective structure extending downwardly, and to arrange the driving means to be protected on the mostly plane bottom of said protective structure.

However, these protective structures have heretofore been designed only for one driving direction on the ship and in most instances only for forward drive. In such an instance the approximately vertically extending side walls of the protective structure converge toward the front in a stream-lined manner so that these walls deflect floating bodies coming from the front such as floating ice and the like and then pass the said bodies laterally by the driving means.

If the protective structure is designed for backward drive only, the above mentioned converging side walls converge toward the rear. The drawback of these known arrangements consists in that when the driving direction of the ship is changed, for instance when maneuvering, there exists the danger that the floating ice or the like floats into the propeller stream and damages the latter or the transmission therefor.

It is, therefore, an object of the present invention to overcome the above mentioned drawbacks.

It is another object of this invention to provide a protective structure for the driving means of a ship which structure will be effective when driving forwardly as well as when driving backwards so that the driving means will be protected in either driving direction of the ship as well as during the change of the driving direction.

These and other objects and advantages of the invention will appear more clearly from the following specification in connection with the accompanying drawings in which:

Figs. 1 and 2 illustrate a side view and rear view respectively of the stern of a ship having a vane wheel propeller drive and being provided with a protective structure according to the invention.

Fig. 3 is a bottom view of the stern with the protective structure according to the invention.

Figs. 4 and 5 respectively illustrate a side view and rear view of the stern of a ship provided with a propeller drive and a protective structure somewhat modified over the protective structure shown in Figs. 1 to 3.

Fig. 6 is a bottom view of the arrangement shown in Figs. 4 and 5.

Figs. 7 and 8 illustrate a side view and bottom view respectively of a bow propeller with a protective structure according to the invention.

General arrangement

According to the present invention, the bottom of the ship within the range of the propeller afflux and efflux is provided with a protective structure which is laterally confined by vertical or nearly vertical walls—side walls— which converge toward the front and toward the rear in a streamlined manner. Due to this double wedge form, floating bodies will safely be deflected toward the sides and passed by the propeller of the ship without danger thereto irrespective of whether the ship drives forwardly or rearwardly.

The entire protective structure is disposed below the water line and is closed by a bottom below which the propeller, such as a vane propeller, is arranged.

When employing the protective structure according to the invention in connection with bow propellers, there is obtained an additional improvement in the forward driving effect over heretofore known protective structures which latter are designed for a deflecting effect in one single driving direction only. It has been found that the propeller stream separates from the ship body along those lower edges of the protective structure which are arranged in the rear of said structure when looking in driving direction. Due to this phenomenon, the lower driving stream moves in between the bottom of the ship and the propeller stream. The reduction in the frictional suction caused thereby brings about the above mentioned improvement of the forward driving effect.

With regard to the term "frictional suction," it should be kept in mind that the total resistance encountered by a floating ship comprises two components, namely, the so-called form resistance and the frictional resistance, the latter only being of importance as to the explanation of the "frictional resistance." The frictional resistance is determined by the surface area and the roughness of the immerged body of the ship and also by the viscosity and the speed of the water. If the immerged surface area of the ship, the roughness thereof, and the viscosity of the water are assumed to be constant, the magnitude of the frictional resistance depends only on the speed of the water streaming by the body of the ship. This speed at the bow of the ship corresponds substantially to the travelling speed and decreases toward the stern of the ship. If now a propelling member is arranged within the range of the front portion of the ship, the speed of the water at the bow does not any longer equal the speed of the ship but is higher than the speed of the ship because the propelling member accelerates the water in front thereof. In the propelling member itself a considerable increase of the speed of the water occurs so that the water leaves the propelling member at a higher speed. This last mentioned speed may be a multiple of the travelling speed of the ship, depending on the load. Even when the travelling speed remains the same, at least portions of the immerged body of the ship are passed around by water of increased speed, whereby the frictional resistance is considerably increased. This increase in the frictional resistance is termed "frictional suction".

According to the invention, due to the streamlined protective structure, the propeller working below the bottom of said structure is moved away from the body of the ship to such an extent that the water leaving the propeller at increased speed will not hit the body of the ship any longer at full intensity. The normal flow of the water in which the ship floats enters between the outer screen of the ship and the propeller jet so that an increase of the frictional resistance is avoided to a considerable extent, which means that the frictional resistance is decreased. This improvement may in certain instances be so great that the increase in the resistance encountered by the ship and caused by said protective structure is partially or even entirely compensated for. A complete compensation is encountered particularly when the protective structure is of a slender design, in other words has a great ratio between its length and width and thus encounters only a small resistance of its own.

A further advantage of the arrangement according to the present invention is encountered with ships which have a so-called double end drive, i.e. with ships which in addition to a bow propeller having associated therewith a protective structure, also comprise a stern propeller. Since in this instance the propeller stream of the bow propeller cannot be guided any longer along the ship body, the exit velocity of this stream decreases faster than with ships with protective structure, and the entrance velocity into the stern propeller is therefore lower. Also in this instance an increase in the total forward driving effect is obtained.

Ships with a plurality of forward driving means may without difficulty be provided with such protective structure within the range of each forward driving means. However, it is also possible to provide a protective structure common to a plurality of adjacent forward driving means.

According to a particularly favorable design of the arrangement according to the present invention, the side walls of the protective structure may be inclined on all sides so that the protective structure becomes either wider or narrower toward the lower portion thereof. Tests have proved that when the protective structure becomes wider toward the lower portions thereof, in other words is provided with slightly outwardly inclined side walls, an increased deflecting effect with regard to floating bodies for instance ice floes is obtained while, however, a greater floating resistance is to be encountered. Such a design, therefore, is primarily to be selected for slow or not frequently moving ships such as dredges, floating cranes or the like. When faster driving ships are involved, i.e. for the major portion of the field of application for the arrangement of the invention, those protective structures have proved preferable which become narrower toward their lower portions; in other words protective structures with slightly inwardly inclined side walls have proved preferable in view of their reduced hydraulic resistance.

According to a further development of the invention, the bottom of the protective structure may protrude laterally. This improves the deflecting effect, especially with a protective structure the side walls of which become narrower toward the lower portion of the protective structure.

If the bar keel at the ship bottom extends up to the protective structure, the converging side walls of the protective structure may advantageously merge with the bar keel.

The protective structure may be provided with a flat surface bottom on which the driving means—in this instance particularly a vane wheel propeller—is arranged. When employing screw propellers it is advantageous to design the bottom of the protective structure in the form of a tunnel into which the driving means extends partially or entirely.

Structural arrangement

Referring now to the drawing in detail and Figs. 1 to 3 thereof in particular, it will be seen that the bottom 1 of the stern is provided with a downwardly extending protective structure 2. The side walls of this protective structure are inclined slightly inwardly (see Fig. 2) while they converge in a streamlined manner toward the rear as well as toward the front at 3. As will be seen from the drawing, the bottom view of the protective structure shows some resemblance to the cross-section of an airplane wing, however, with the difference that what is termed the leading edge and the trailing edge of an airplane cross-section respectively forms the trailing edge and the leading edge of the protective structure according to the invention. Thus the side walls of the protective structure of this invention represent deflecting surfaces for bodies which float in the direction toward the driving means, in this particular instance toward the vane wheel stern propeller 4 of Figs. 1 to 3, or toward the vane wheel bow propeller 40 of Fig. 7. The vane wheel propellers 4 and 40 are mounted on the flat bottoms 5 and 5′ respectively of the protective structure, and the propeller blade shafts or shanks 40 extend through the protective structure. The bottoms 5 and 5′ protrude beyond the side walls of the protective body at 5a whereby the deflecting effect is still increased.

With regard to Figs. 4 to 6, the ship bottom is again designated with the reference numeral 1. The protective structure 2 shown in Figs. 4 to 6 is provided with side walls which are inclined slightly outwardly from the ship bottom downwardly. This ship form is suitable for slowly driving ships or for ships which do not move frequently. The bottom 5 of the protective structure 2 is, in this instance not flat but is designed in the shape of a tunnel 6 into which the ship propeller extends partially. The front portion of the protective structure gradually merges with the bar keel.

It is, of course, understood that the present invention is, by no means, limited to the particular constructions shown in the drawing but also comprises any modifications within the scope of the appended claims.

What I claim is:

1. In combination with a ship: two walls connected to the bottom of said ship and extending downwardly therefrom, said walls converging at their front and rear ends while the distance between said walls gradually increases from said converging ends toward a section therebetween thereby forming a contour resembling a cross section of an airplane wing, a bottom plate connected to the lower ends of said walls and confining with said walls and that portion of the bottom of said ship which is delimited by said walls a closed chamber, and propelling means arranged below said bottom plate and including shaft means extending through said bottom plate.

2. An arrangement according to claim 1, in which said walls are arranged near the stern of said ship, and in which the greatest distance between said walls is closer to the rear ends of said walls than to the front ends thereof.

3. An arrangement according to claim 1, in which said walls are arranged near the bow of said ship, and in which the greatest distance between said walls is closer to the front ends of said walls than to the rear ends thereof.

4. In combination with a ship: a protective structure including a pair of substantially vertical walls having their upper ends connected to the bottom of said ship and converging at their front and rear ends from oppositely located spaced sections of said walls, bottom plate means connected to the bottom ends of said walls and protruding outwardly beyond said walls, and propelling means arranged below said bottom plate means.

5. In combination with a ship: two walls connected to the bottom of said ship and extending downwardly therefrom, said walls converging at their front and rear ends while the distance between said walls gradually increases from said converging ends toward a section therebetween thereby forming a contour resembling a cross section of an airplane wing, a bottom plate connected to the lower ends of said walls and confining with said walls and that portion of the bottom of said ship which is delimited by said walls a closed chamber, said bottom plate being arched upwardly in longitudinal direction as well as in the direction transverse thereto, and screw propeller means arranged below the longitudinally arched portion of said bottom plate.

6. In combination with a ship having a bar keel: two walls connected to the bottom of said ship and extending downwardly therefrom, said walls converging at their front and rear ends while the distance between said walls gradually increases from said converging ends toward a section therebetween thereby forming a contour resembling a cross section of an airplane wing, two converging ends of said walls merging with said bar keel, a bottom plate connected to the lower ends of said walls and confining with said walls and that portion of the bottom of said ship which is delimited by said walls a closed chamber, and propelling means arranged below said bottom plate and including a shaft extending through said bottom plate.

7. In combination with a ship having a propeller: a protective structure connected to the bottom of said ship and disposed entirely below the normal water line of said ship and above said propeller, said protective structure comprising substantially vertical walls having their upper ends connected to the bottom of said ship and gradually converging in a direction toward the front and the rear of said propeller from oppositely located sections of said walls which are closest to the said propeller and are spaced from each other by a distance greater than the diameter of said propeller, and bottom plate means connected to the lower ends of said substantially vertical walls, said bottom plate means being arranged above said propeller and closing the space confined by said walls.

8. A floating body having a submerged bottom surface, propelling means below said bottom surface, and a streamline protective structure fixed to said body between said bottom surface and said propelling means, said protective structure extending longitudinally forward and aft of said propelling means, said structure having longitudinal, outwardly facing deflecting surfaces extending downwardly from said body surface and spaced from the longitudinal center line of said bottom surface adjacent said propelling means at least the lateral extent of said propelling means, said deflecting surfaces converging from the intermediate portion of said structure to the opposite ends of said structure, the longitudinal extent of said surfaces being substantially greater than the maximum lateral spacing of said surfaces to provide a streamline form of the protective structure.

9. In combination with a ship having a bottom surface and propelling means below said bottom surface: a streamline protective structure located between the bottom of said ship and said propelling means and including a pair of downwardly extending walls having their upper edges fixed to the bottom of said ship and converging at their front and rear ends from oppositely located spaced sections of said walls to meet at an angle at each end to form wedge-shaped ends, and bottom plate means fixed to the bottom edges of said walls and above said propelling means, the length of said walls being substantially greater than the maximum spacing of said walls.

10. In combination with a ship having a bottom surface and propelling means below said bottom surface: a streamline protective structure located between the bottom of said ship and said propelling means and including a pair of downwardly extending walls having their upper edges fixed to the bottom of said ship and converging at their front and rear ends from oppositely located spaced sections of said walls to meet at an angle at each end to form wedge-shaped ends, bottom plate means fixed to the bottom edges of said walls and above said propelling means, and a vane wheel propeller having a plurality of blades arranged below said bottom plate means, and a substantially vertical shank means connected to said propeller blades.

11. In combination with a ship having a bottom surface and propelling means below said bottom surface: a streamline protective structure located between the bottom of said ship and said propelling means and including a pair of downwardly and outwardly inclined walls having their upper edges fixed to the bottom of said ship and converging at their front and rear ends from oppositely located spaced sections of said walls to meet at an angle at each end to form wedge-shaped ends, and bottom plate means fixed to the bottom edges of said walls and above said propelling means, the length of said walls being substantially greater than the maximum spacing of said walls.

12. In combination with a ship having a bottom surface and propelling means below said bottom surface: a streamline protective structure located between the bottom of said ship and said propelling means and including a pair of downwardly and inwardly inclined walls having their upper edges fixed to the bottom of said ship and converging at their front and rear ends from oppositely located spaced sections of said walls to meet at an angle at each end to form wedge-shaped ends, and bottom plate means fixed to the bottom edges of said walls and extending outwardly beyond said walls, and above said propelling means, the length of said walls being substantially greater than the maximum spacing of said walls.

References Cited in the file of this patent

UNITED STATES PATENTS

| | | |
|---|---|---|
| 881,537 | Bethany | Mar. 10, 1908 |
| 1,050,458 | Hilden | Jan. 14, 1913 |
| 1,262,942 | Graumlich | Apr. 16, 1918 |
| 1,302,362 | Graham | Apr. 29, 1919 |
| 2,058,383 | Maynes | Oct. 20, 1936 |

FOREIGN PATENTS

| | | |
|---|---|---|
| 832,199 | France | June 27, 1938 |
| 852,960 | Germany | Oct. 20, 1952 |